US009658068B2

(12) United States Patent
Troxler

(10) Patent No.: US 9,658,068 B2
(45) Date of Patent: May 23, 2017

(54) POSITION AND PROXIMITY DETECTION SYSTEMS AND METHODS

(71) Applicant: Robert Ernest Troxler, Raleigh, NC (US)

(72) Inventor: Robert Ernest Troxler, Raleigh, NC (US)

(*) Notice: Subject to any disclaimer, the term of this patent is extended or adjusted under 35 U.S.C. 154(b) by 0 days.

(21) Appl. No.: 14/047,231

(22) Filed: Oct. 7, 2013

(65) Prior Publication Data

US 2014/0104063 A1 Apr. 17, 2014

Related U.S. Application Data

(63) Continuation of application No. 13/398,498, filed on Feb. 16, 2012, now Pat. No. 8,624,723, which is a continuation of application No. 13/073,929, filed on Mar. 28, 2011, now Pat. No. 8,149,110, which is a continuation of application No. 12/179,078, filed on Jul. 24, 2008, now Pat. No. 7,920,066, which is a continuation of application No. 11/196,041, filed on Aug. 3, 2005, now Pat. No. 7,786,876, which is a continuation of application No. 10/035,937, filed on Dec. 26, 2001, now Pat. No. 7,034,695.

(60) Provisional application No. 60/258,246, filed on Dec. 26, 2000.

(51) Int. Cl.
*G08B 21/18* (2006.01)
*G01C 21/00* (2006.01)
*G08B 21/02* (2006.01)

(52) U.S. Cl.
CPC ......... *G01C 21/005* (2013.01); *G08B 21/023* (2013.01); *G08B 21/0211* (2013.01); *G08B 21/0269* (2013.01); *G08B 21/0277* (2013.01)

(58) Field of Classification Search
CPC ............ G08B 21/0269; G08B 21/0272; G08B 21/0275; G08B 21/0277; G08B 21/028; G01C 21/00; G01C 21/02; G01C 21/005
USPC ....... 340/573.1, 573.3, 573.4, 539.1, 539.11, 340/539.12, 539.13, 539.15, 686.1, 10.41, 340/10.6; 342/357.07, 357.09, 357.12, 342/357.64, 457; 455/429; 701/2; 119/719, 721
See application file for complete search history.

(56) References Cited

U.S. PATENT DOCUMENTS

| 4,653,316 A | 3/1987 | Fukuhara |
| 4,831,539 A | 5/1989 | Hagenbuch |
| 4,965,568 A | 10/1990 | Atalla |
| 5,568,119 A * | 10/1996 | Schipper et al. .......... 340/573.4 |
| 5,650,928 A | 7/1997 | Hagenbuch |

(Continued)

OTHER PUBLICATIONS

U.S. Non-Final Office Action for U.S. Appl. No. 14/562,858 dated Oct. 7, 2016.

*Primary Examiner* — Van Trieu
(74) *Attorney, Agent, or Firm* — Olive Law Group, PLLC

(57) ABSTRACT

Position and proximity detection systems and methods are disclosed. According to an aspect, a computing device may include a processor configured to determine a position coordinate of a first movable device. Further, the processor is configured to determine whether the position coordinate of the first movable device is a predetermined distance from a second movable device. The processor is also configured to signal the second movable device in response to determining that the position coordinate of the first movable device is a predetermined distance from a second movable device.

32 Claims, 22 Drawing Sheets

(56) References Cited

U.S. PATENT DOCUMENTS

| | | | |
|---|---|---|---|
| 5,669,061 A * | 9/1997 | Schipper | 455/429 |
| 5,719,771 A | 2/1998 | Buck | |
| 5,742,233 A | 4/1998 | Hoffman | |
| 5,742,237 A | 4/1998 | Bledsoe | |
| 5,774,876 A | 6/1998 | Woolley | |
| 5,804,810 A | 9/1998 | Woolley | |
| 5,823,481 A * | 10/1998 | Gottschlich | B61L 23/16 246/28 R |
| 5,825,283 A | 10/1998 | Camhi | |
| 5,959,568 A | 9/1999 | Woolley | |
| 5,982,325 A | 11/1999 | Thornton | |
| 6,173,231 B1 | 1/2001 | Chojnacki | |
| 6,640,164 B1 * | 10/2003 | Farwell et al. | 701/2 |
| 6,748,902 B1 * | 6/2004 | Boesch et al. | 119/719 |

\* cited by examiner

DATASHEET GPS-MS1E

○ SENSOR POSITIONS

THRESH HOLD < 151 DEGREES

THRESH HOLD < 151 DEGREES

POSITION AND PROXIMITY DETECTION SYSTEMS AND METHODS

CROSS REFERENCE TO RELATED APPLICATIONS

This is a continuation of U.S. patent application Ser. No. 13/398,498, filed Feb. 16, 2012, now U.S. Pat. No. 8,624,723; which is a continuation of U.S. patent application Ser. No. 13/073,929, (now U.S. Pat. No. 8,149,110) filed Mar. 28, 2011; which is a continuation of U.S. patent application Ser. No. 12/179,078, (now U.S. Pat. No. 7,920,066), filed Jul. 24, 2008; which is a continuation of U.S. patent application Ser. No. 11/196,041, (now U.S. Pat. No. 7,786,876), filed Aug. 3, 2005; which is a continuation of U.S. patent application Ser. No. 10/035,937, (now U.S. Pat. No. 7,034,695), filed Dec. 26, 2001, which claims the benefit of expired U.S. Provisional Patent Application No. 60/258,246, filed Dec. 26, 2000, the contents of all of which are hereby incorporated by reference.

TECHNICAL FIELD

This invention relates to defining and detection of a 3-D boundary or volume using (D)GPS (Global Positioning System) technology. In particular, it relates to an integrated instrument and method for inputting coordinates, processing these coordinates, and taking a corrective action with respect to the boundary.

BACKGROUND

The current practice and state of the art in the pet containment industry is to use radio waves to detect when a pet such as a dog has come too close to a boundary. In these systems, it is required that the pet owners bury a wire around the perimeter of the boundary and connect a modulated signal generator to the wire loop. The pet then wears a spacial collar that detects the electromagnetic field emitted from the wire loop and administers a correction signal to the animal when it approaches the boundary. The wire is buried around the perimeter of the yard, and the active zone of the collar can be adjusted by increasing or decreasing the amplitude of the signal generator.

The collar usually contains a two axis pickup coil to detect the magnetic fields around the loop and the necessary electronics to discriminate against noise and amplify and compare signals to produce a high voltage shock. Although these systems are not visible on the property and are less laborious to install than a standard post fence, there is still quite a lot of work involved in burying the wire loop. Furthermore, there is a maximum area which can be attained.

In the past, wireless systems have been developed to overcome these problems. For example, U.S. Pat. No. 5,381,129 to Boardman describes a system that incorporates transmitting antennas installed on the property and a collar worn by the dog to process the antenna transmissions and deliver an electrical shock when a dog advances to a boundary. However, the complexity and expense of these systems makes them undesirable. Furthermore, the spacial resolution is limited for precise boundary discrimination.

Prior attempts to produce a GPS based containment system have had limited success, primarily because of their approach. For instance, U.S. Pat. No. 6,271,757 to Touchton et al. describes a GPS containment system for pet containment. This system requires an external computer to perform all calculations and decision making U.S. Pat. No. 6,271,757 is related to U.S. Pat. No. 6,043,747 and requires a separate portable programming transceiver to program the boundary of a selected confinement area. The programming transceiver must be moved along such boundary during programming. This system requires a collar for wear by the pet and a computer located at a remote base to process the necessary data for the system. This system requires at least two GPS systems for operation.

U.S. Pat. No. 6,271,757 describes a GPS based pet containment system whereby the user walks the perimeter with a separate transceiver, and the transceiver simply transmits the coordinates to a Windows based PC located at the house. The PC (Personal Computer) then stores the information in memory and contains software to map out the boundary of the containment area. Furthermore, the system includes a dog collar for transmitting GPS coordinates to the PC, wherein the PC performs all computations and determines whether the dog has breached a safe zone. If there has been a breach, then the PC issues a separate radio signal to the dog collar, which activates a correction signal. Hence, in this system, the collar only relays information and all processing is performed remotely. Thus, this system requires at least two GPS systems. The system includes a dog collar containing a GPS receiver and a radio link for the coordinates, a portable programming transceiver with a GPS system including a radio link for the coordinates, a PC, a communication device on the PC and satellite monitoring computer including a GPS system and modem. Furthermore, this invention is operable in only 2 dimensions and all equipment must function in conjunction with the remote PC. To program the boundary, the transceiver requires the operator to press buttons to add containment points, and it must be informed which areas are safe and excluded. An added problem with this invention concerns multiple targets. In this embodiment, the control station must address all dogs, and the control station must compute, determine, and execute simultaneously to all dogs in an area through some addressable technique. This solution can be costly and complicated.

Another example, U.S. Pat. No. 6,868,100 to Marsh, requires a separate boundary definition transmitter to record data to a portable unit and discusses a fixed station for addressing the livestock. For livestock management, all processing is performed at the external processor and only simple area geometries are described.

The present invention features full duplex communication for inputting coordinates, as well as reporting information such as location, speed, medical parameters, and satellite health. The device of the present invention has the capability to call or transmit important information such as location, speed, identity, and medical parameters to a station automatically or when polled. All necessary analog and digital circuitry, (D)GPS hardware, microprocessor, programming, and communications hardware are fully integrated into a small device.

SUMMARY

Position and proximity detection systems and methods are disclosed. According to an aspect, a computing device may include a processor configured to determine a position coordinate of a first movable device. Further, the processor is configured to determine whether the position coordinate of the first movable device is a predetermined distance from a second movable device. The processor is also configured to signal the second movable device in response to determining that the position coordinate of the first movable device is a predetermined distance from a second movable device.

BRIEF DESCRIPTION OF THE DRAWINGS

Exemplary embodiments of the invention will now be explained with reference to the accompanying drawings, of which.

DETAILED DESCRIPTION

The present invention will now be described more fully hereinafter with reference to the accompanying drawings, in which the preferred embodiments of the invention are shown. This invention may be embodied in many different forms and should not be construed as limited to the embodiments set forth herein; rather, these embodiments are provided so that this disclosure will be thorough and complete, and fully convey the scope of the invention to those skilled in the art.

Figure 1A:
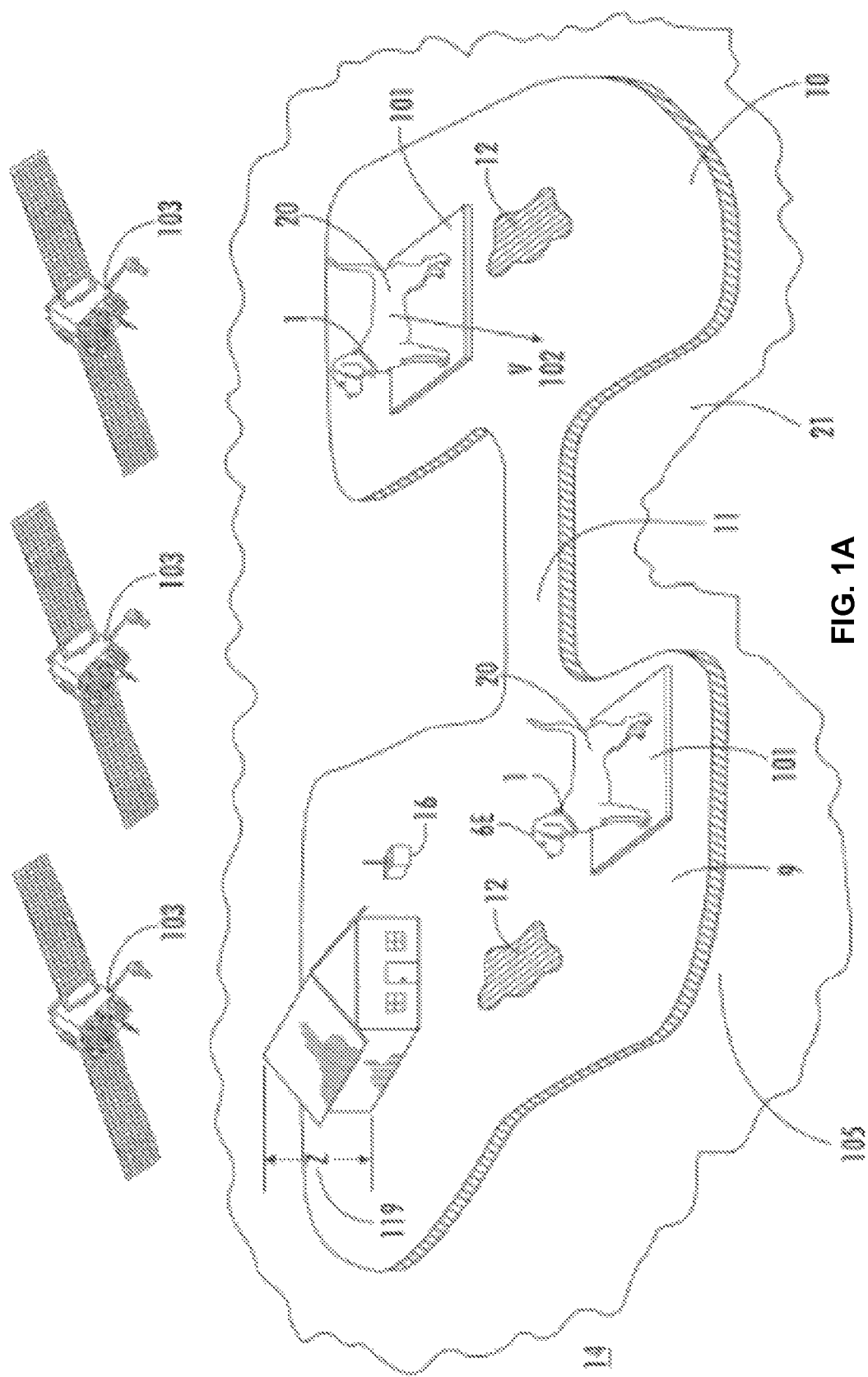
FIGS. 1A-1C are schematic views of exemplary environments for utilizing the device of the present invention.

Referring to FIG. 1A, a schematic view of the environment for utilizing the device of the present invention is illustrated. In this configuration, the module is used to keep a pet inside a defined boundary. Note that there are many embodiments that this programmable device will apply. Just a few examples are listed in FIGS. 6A through 6E, described below. In each example, the boundary volume is defined with safe zones 11, unsafe zones 12, soft zones, dynamic zones 101, and hysteresis zones 21. The dynamic zones could represent moving aircraft on the ground or in the air. Similar systems such as TCAS operate off aircraft transponders and are disabled near the ground.

This invention is applicable in the air or on the ground. In these examples, two way communications collar 1 to another collar 1, or collar to base 16 are established, and specific algorithms are incorporated to notify a station when a subject has crossed a boundary, or to apply a corrective or warning signal. Subjects can be included in a boundary, excluded in a boundary, the union of multiple boundaries can be arranged.

Figure 3A:
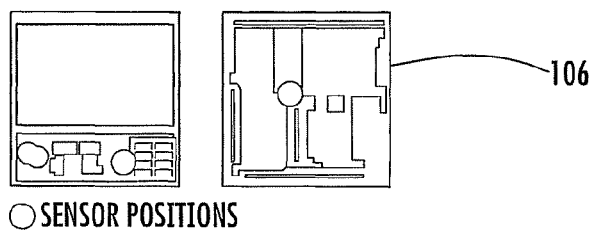
FIGS. 3A-3C and 4 are schematics of components for use with the present invention.
Figure 6A:
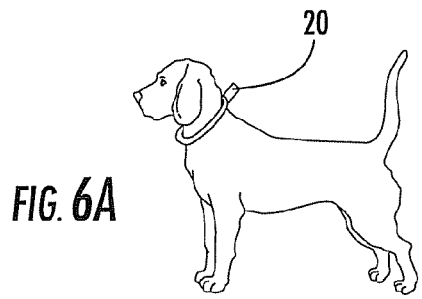
FIGS. 6A-6E is a perspective view of different objects for utilizing a device of the present invention.
Figure 6B:
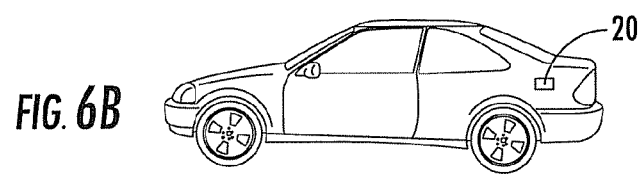
Figure 6C:
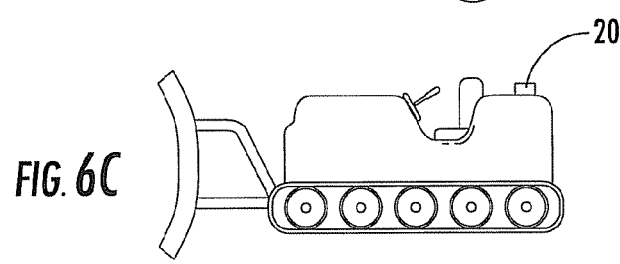
Figure 6D:
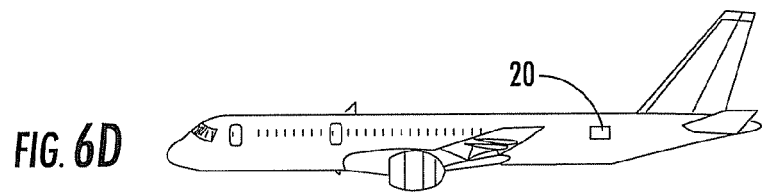
Figure 6E:
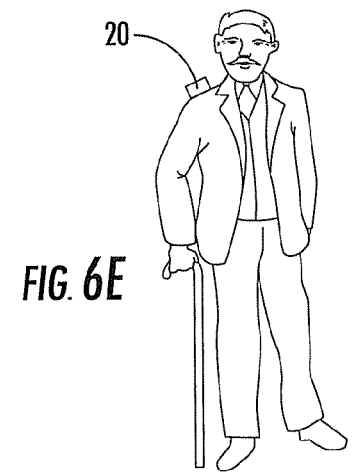

In one embodiment, the collar can contain a module 106 shown in FIG. 3A manufactured by µ-BLOX™ in Zurich, Switzerland. The GPS-MS1E-AT is a fully self-contained receiver module based on the SiRFstar™ chip set with a Hitachi risk microprocessor. For development, an evaluation kit such as the g-blox can be purchased GPS-MS1E-SCK with a Hitachi™ C compiler, which was included in the customization kit. This system contains all the command sets necessary to modify the µ-BLOX™ programming codes for a particular task. The µ-BLOX™ MS1E-AT also has the capability to transmit the module coordinates through its AT command set. Not limiting this invention to a particular method of transmitting, the AT system in communication with, but not limited to, a GSM type modem as one such method to real time track the position of an animal, person, or thing with the ability to immediately locate the subject. In this mode, the subject's location can be found in the specified boundary, when it crosses a boundary, or when it is polled to report a location. The subject can also request poll in particular uses such as illustrated in FIG. 6E, described below. Here, a patient can activate the collar for requested assistance. For hunting dogs, it may not be necessary to use the one or both alarms, and the position and velocity of the animal could be polled any time. By using velocity and acceleration vectors, position estimates can be calculated. Antenna 3 is currently an active microstrip antenna. However, it could be a passive antenna or an antenna loop embedded in the collar of the animal or structure.

There are many ways to program the GPS module. For instance, in one method, a laptop or other portable computer system known to those of skill in the art can plug into collar port 7. In this mode, the laptop can download the coordinates from the boundary into the collar where the coordinates can be stored in a memory. In another method, the coordinates could be manually entered and loaded into the collar through port 7. In another embodiment, a mapping extracted from a web-based application such as the GIS system could be used to download three-dimensional coordinates, and the collar 7 would then specify the volume of interest and store the data.

In a preferred embodiment of training, the microprocessor in the collar can handle all the calculations. In this preferred embodiment, the collar is placed on the pet and the pet would walk around the boundary. During this walk, the collar can read the location coordinates and store the coordinates in the proper memory slot in the onboard computer. The embedded software then stores and maps the boundary during this "training phase". In the operational phase, the embedded processor reads the 3-D coordinates, compares these real-time coordinates to the boundary or surface, and sounds a plurality of alarms when the subject approaches the boundary.

The embedded processor can also analyze the site to make sure that the reception is satisfactory for use. In the event that a weak signal was detected, steps could be undertaken to solve the problem. In one design, "SignalView" program could simply incorporate the use of an output pin 110, 111 on the GPS-MS1E of FIG. 3C. This pin detects faulty satellite operation and can idle the system until good satellite data is observed. The MS1E like many systems has a "trickle power" feature. In the event that the animal is asleep, and no movement is detected, the GPS module would also go to sleep to conserve power. Upon detecting animal movement, the processor would become more active.

For enhanced operation, this system is DGPS ready. In this example, RF communications can transmit the coordinates of a base station in RTCM SC-104 format to the port on the collar.

In the operation phase, a coordinate is read from the satellites. Next, the software compares the coordinate to the list stored during the training phase, and finds the closest queue point. Then, through 3-D triangulation, the μ-BLOX GPS-MS1E decides if the subject is within bounds. In the event that the subject ventures out of bounds, the system will have the ability to report to a base station the coordinates of the module and take evasive action.

The base station shown in FIG. 5, described in more detail below, is used for two-way communication between the collar and a base camp. This station can be a cell phone with the proper programming. The station can also be used as stationary differential GPS correction device since the location of the station will be precisely known. In this mode, any error in the received GPS signals are passed along the collar when operated in the differential mode. Alternatively, the Nationwide Differential GPS service can allow differential mode to be incorporated in the operation of the collar without a plurality of receivers.

Figure 1B:
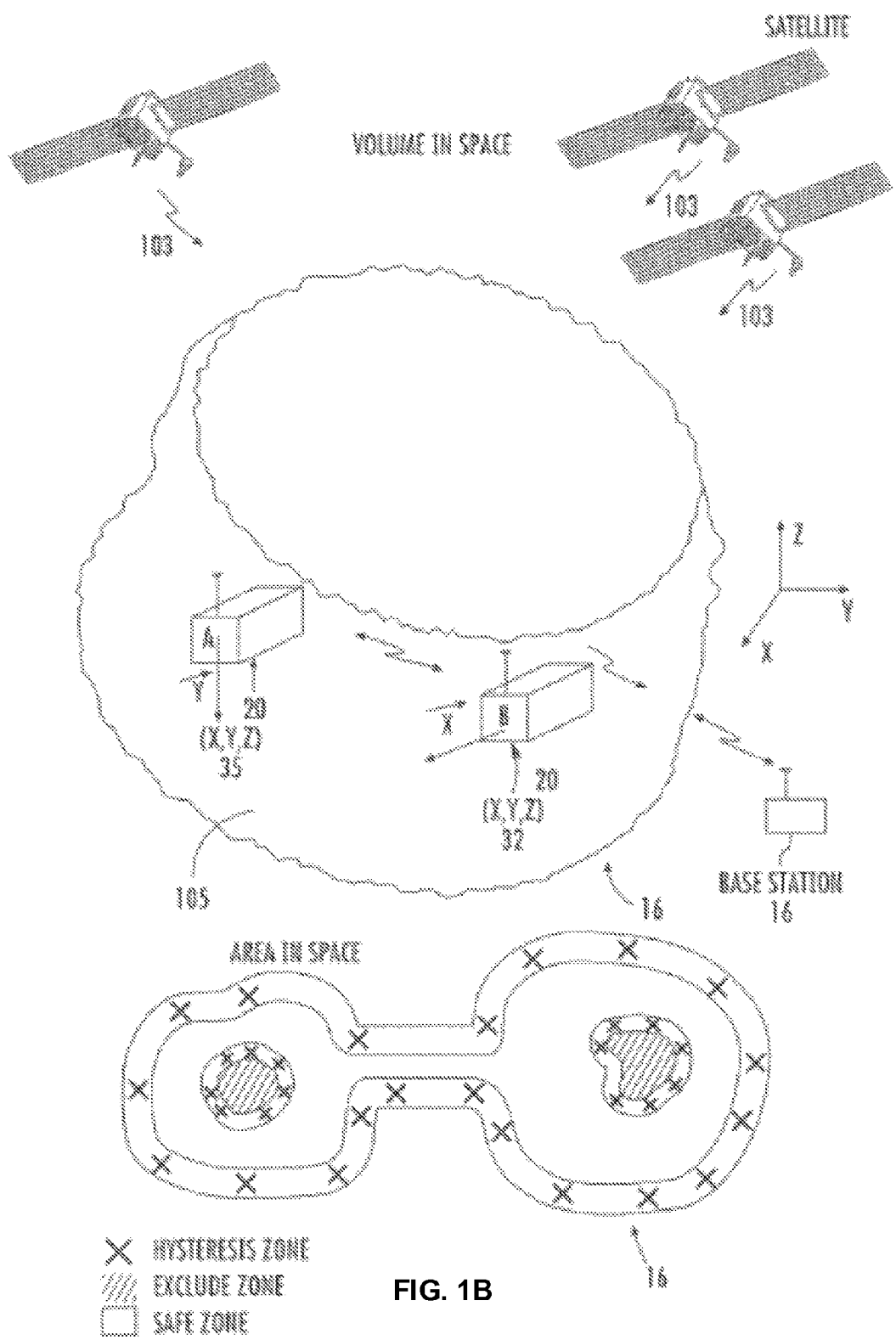
Figure 1C:
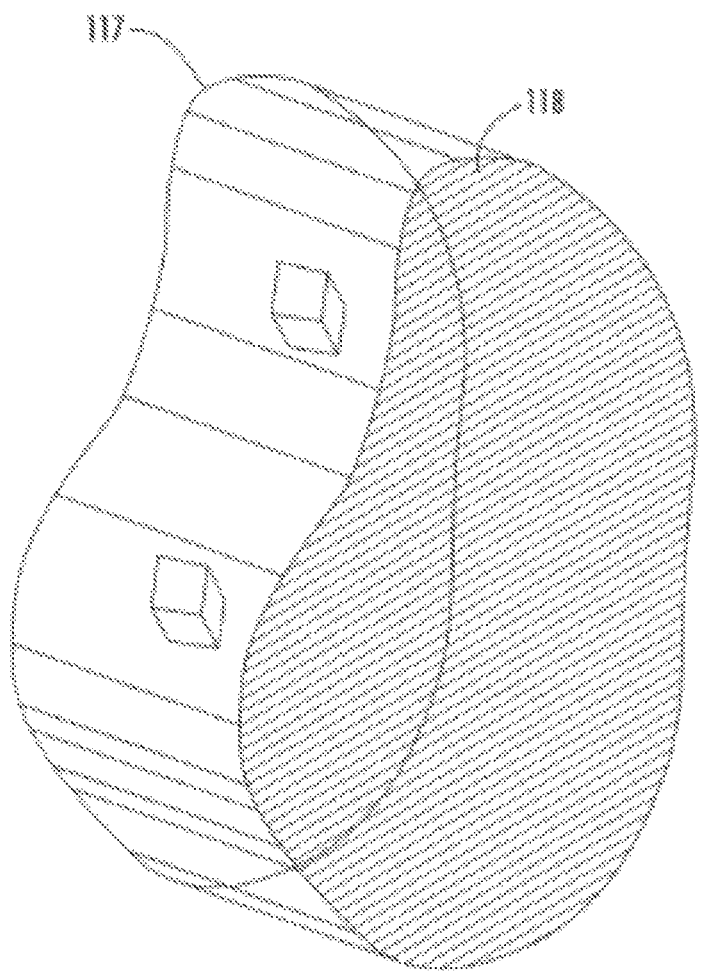

A fully integrated (D)GPS electronic boundary proximity system shown in FIG. 1 is provided for animals, objects, for tracking movement, reporting coordinates, and taking evasive action relative to a selected containment volume. As shown FIGS. 1b and 1c, the main boundary 9 can be three dimensions. Attached to each animal 6E is a fully integrated (D)GPS collar 1, and surrounding the pet is a volume 101 referred to as the "object space". The object space 101 can be uniquely defined by a vector V 102 representing the object space as a point. Satellites 103 transmit and receive signals from collar 1 and possibly a base or mobile station 16. In this invention, collar 1 processes the information received from satellites 103 to detect a boundary space 105 defined by a multiple of areas such as 9, 10, corridor 11, exclusion zones 12, soft zones 21, and exterior zones 14. All areas can be represented by lines for two-dimensional representation, or surfaces for volumetric representations as indicated in FIG. 1. Two-way communications antennas 9 are included on collars 1 and the base station 16.

Figure 2:
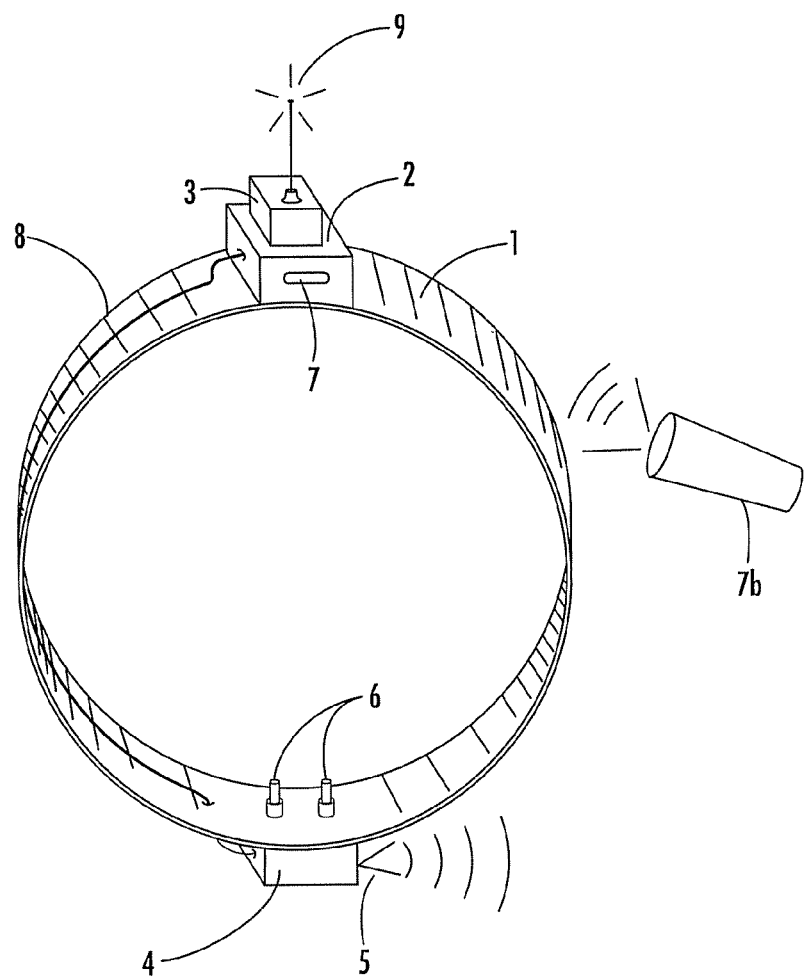
FIG. 2 is a perspective view of a device according to an embodiment of the present invention.

Referring to FIG. 2, an illustration of a collar 1 for defining a containment volume is illustrated. The collar receives (D)GPS signals from satellites 103 and processes the raw data into x,y,z position coordinates. The collar system consists of an attachment device such as a leather band 1, an electronic module 2, a GPS antenna 3, a communication antenna 9, a digital port 7, wiring 8, a correction stimulating device 4, high voltage prongs 6 and an audible signal generator 5. Both communication antenna 9 and GPS antenna 3 can be integrated into a single antenna for consolidation purposes. Antenna 9 is operable to provide a two-way data link. A single antenna can serve the purpose of both the GPS and communications network. Conducting prongs 6 are powered by a watch battery and the necessary high voltage circuitry for delivering an electrical shock. Port 7 is a computer port for allowing communication with the GPS module to download coordinates or uploading data from the GPS-MS1E-AT-DL datalogger. Wire 8 is necessary to electrically connect the electronic module with the GPS module and contains power and a signal to switch the alarms on and off. The collar is attached to an object such as an aircraft, or a pet as indicated in FIGS. 6A E.

Figure 3B:
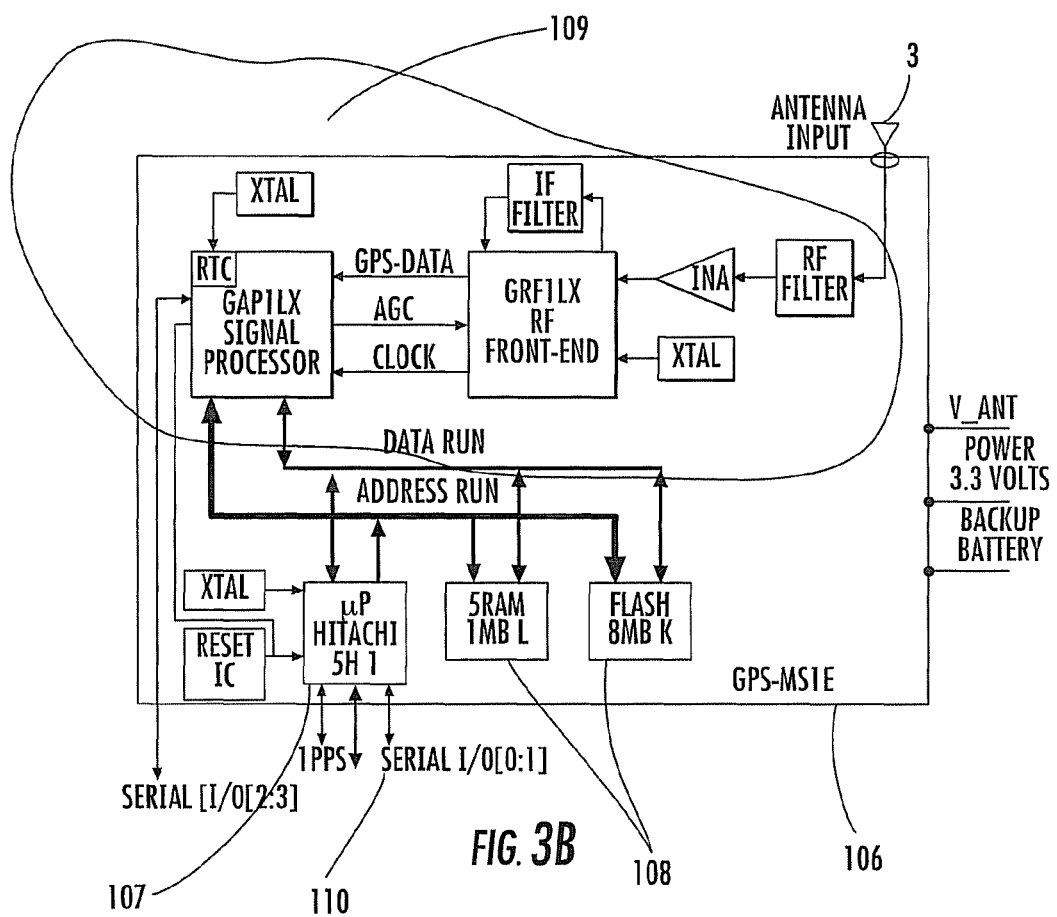
Figure 3C:
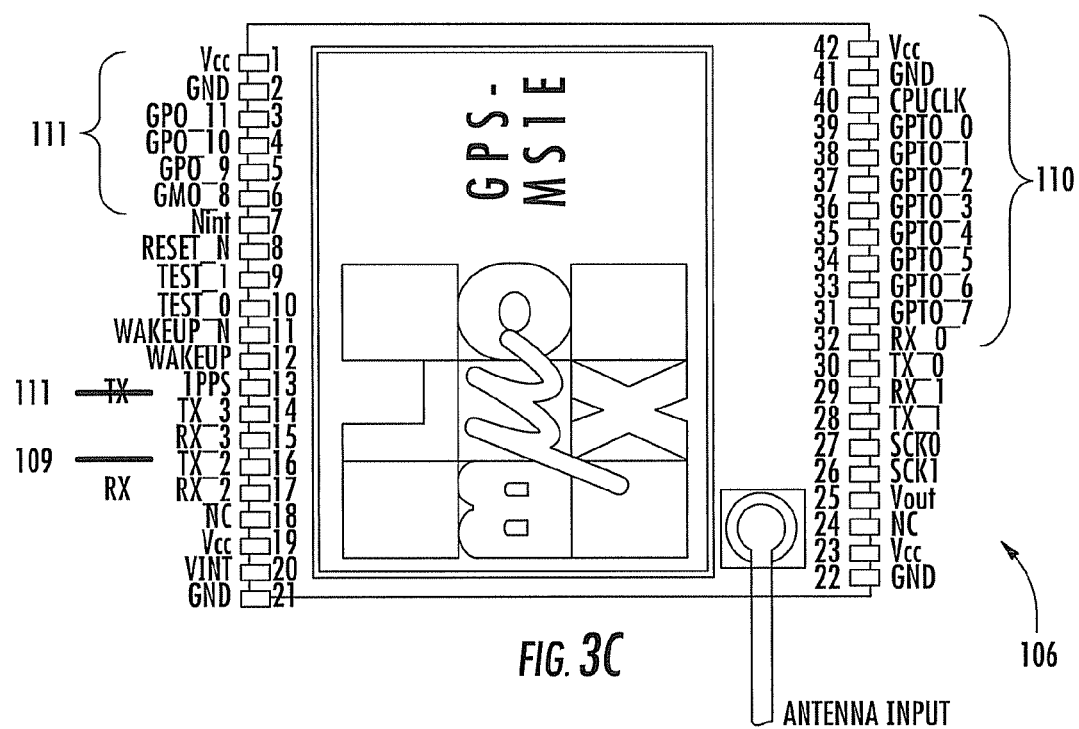
Figure 4:
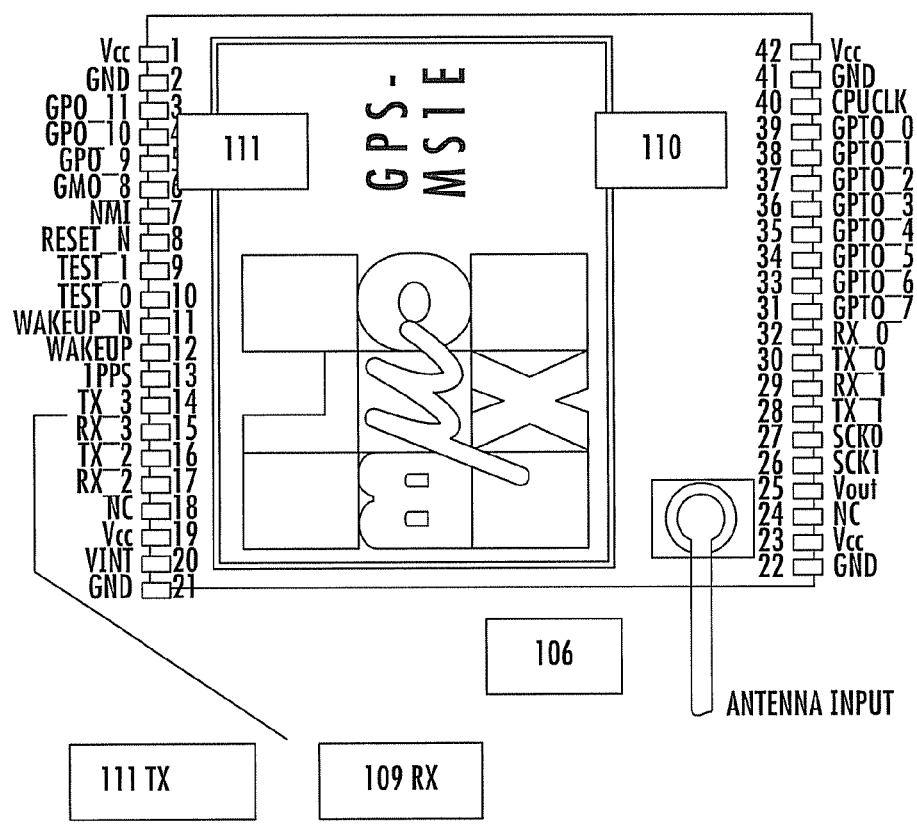
Figure 7:
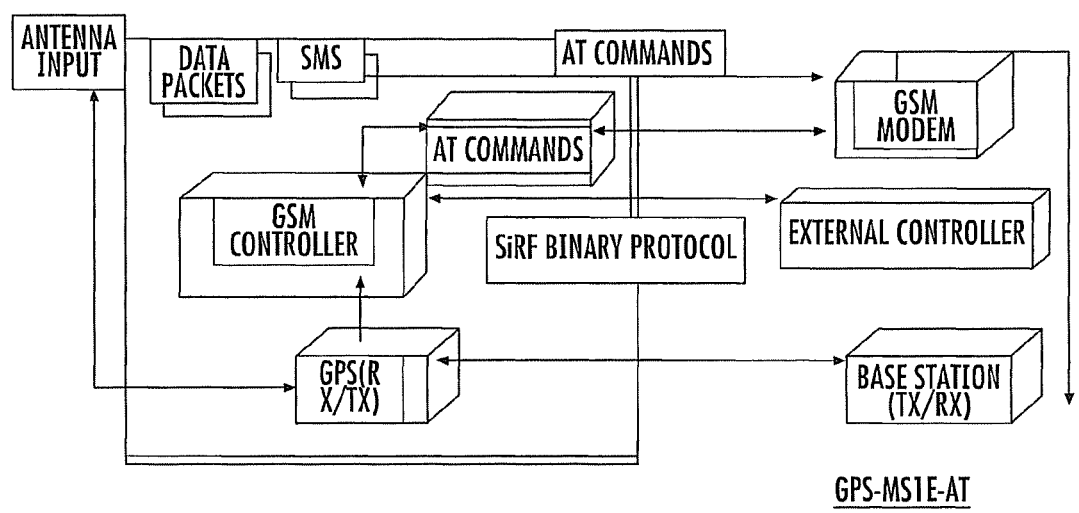
FIGS. 7, 8 and 9 are schematic views of components of the present invention.
Figure 8:
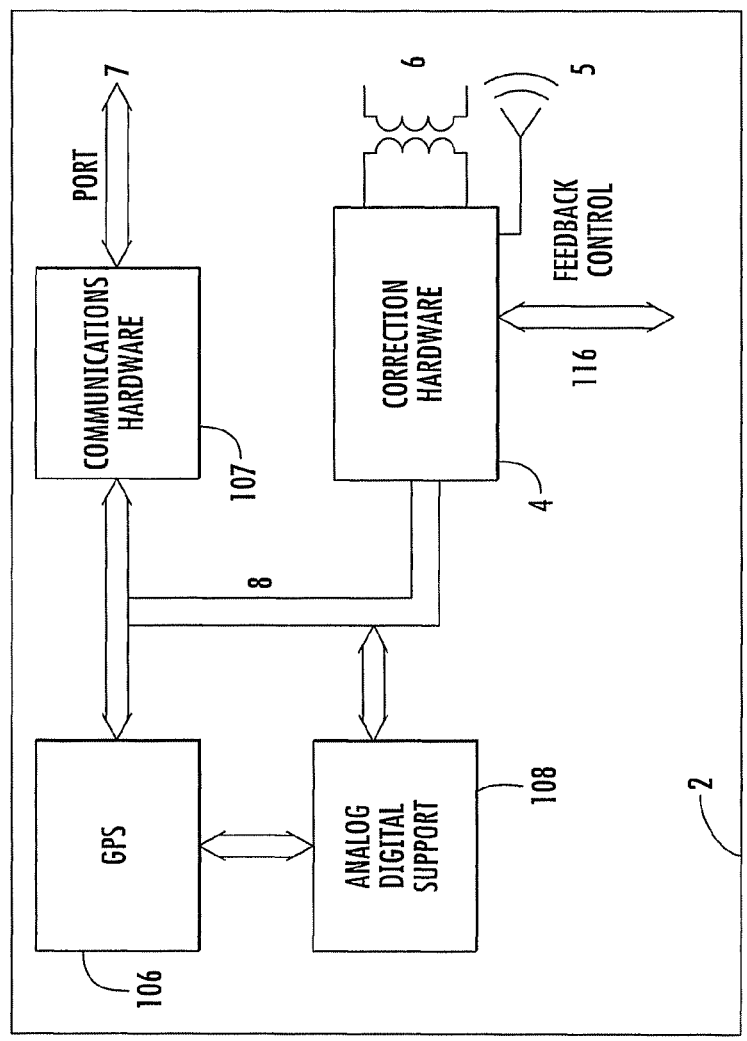
Figure 9:
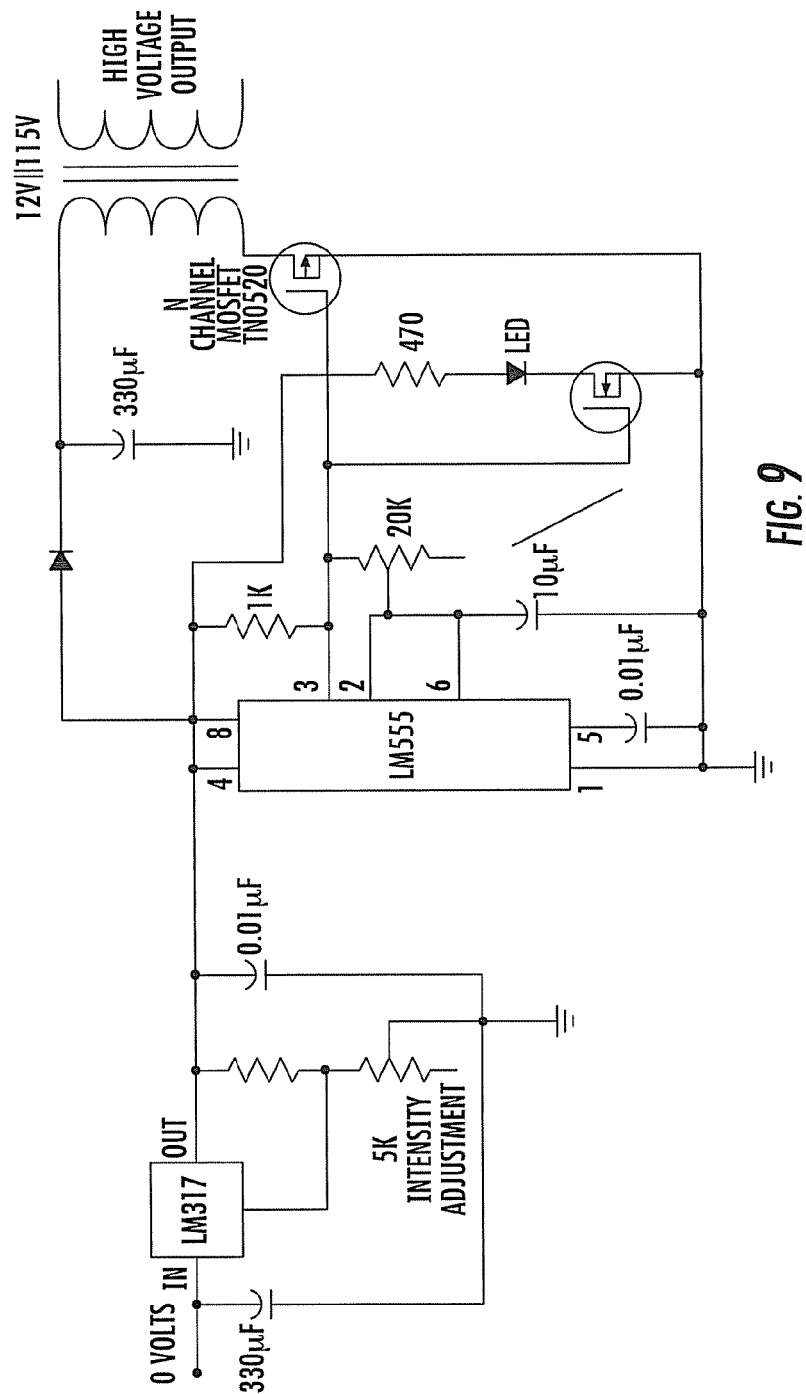

Referring to FIGS. 3 and 4, different schematic views of a (D)GPS module, generally designated 106, are illustrated. The collar can be based on many manufactures of GPS electronic parts. FIGS. 3A and 3B illustrate one such system: a GPS-MS1E-AT manufactured by μ-blox. Module 106 contains a microprocessor 107, memory 108, RF section 109, a GPS antenna 3, eight IO ports 110 such as RS232 or USB, and two GPIO ports 111. Alternatively, ports 111 can be linked by any standard method such as cable, infrared, wireless serial or parallel. In the preferred embodiment, all electronics are integrated into the collar as shown in FIGS. 7, 8, and 9. In this example, the (D)GPS 106, communications module 107, correction 4, and supporting electronics 108 modules have been integrated into a single package 2 (shown in FIG. 2). The E1 contains all necessary electronics to build a "large area proximity detector with alarms". After programming chip 106, it is placed in the portable application device or collar 1. The programmer is housed in the E1 box, which module 106 is inserted. By utilizing the input/output pins inside the programmer, attaching the antenna and communicating through the ports, this device can be realized.

By adding an antenna, a battery, and downloading the code to the module, boundary identification can begin. GPS chip 106 is slightly larger than a postage stamp and in particular is 30.2 mm.times.29.5 mm.times.7.55 mm and is positioned into a standard 84 pin PLCC.

Referring to FIG. 7, a schematic diagram of a communications module is illustrated. Communications module 107 can be based on any wireless method of communication. Several such limited examples such as CDMA, TDMA, FDMA are well known to one skilled in the art. In one embodiment, GSM techniques could be incorporated using off the shelf parts. For integration with the u-blox system, one embodiment would require a GPS receiver (GPS-MS1E-AT), a GSM modem supporting AT interface (GSM 07.05,07.07) and a controller. The controller reads positions from the GPS receiver and controls the on board digital modem.

u-Blox offers an integrated control system for GSM modems with the AT command interface for GPS receivers. This system is designed for autonomous operation. An external controller is not required, however, it can be used for enhanced functionality. An external controller may communicate with the GPS receiver via a serial port with the SiRF binary protocol. The GSM modem is controlled through the GPS receiver. The antenna input can be connected to the GPS-MS1E to receive signals.

In this example, the advantages of integrating with GSM Control Software are: fully compatible to standard μ-blox GPS receivers; configuration through the serial interface; designed for autonomous operation; minimal external circuitry; and no external controller required.

An external controller may communicate with the GPS receiver via a serial port with the SiRF binary protocol. The GSM modem is connected to the other serial port and is controlled through the GPS receiver.

The GSM controller is event driven. For each event an action and the data transmitted can be defined. Events (triggers) may be the output of the GPS engine (position, time) or an external signal. If the conditions for a trigger are met, the assigned action will be performed. This assignment is set during the configuration of the GSM controller. A trigger is assigned to each event, for example,

| ID. | Event/Trigger | Condition | Parameters | Range |
|---|---|---|---|---|
| 04 | Movement | The distance to the last position is above the adjusted value. | Distance [m] | 0-320000 m |

Action can be assigned to the different events. Any action consists of one out of four possible phone number and the data, which will be sent. For example,

| ID. | Action | Description | Remark |
|---|---|---|---|
| 01 | Data SMS | Send a Short Message in PDU Mode | 8 bit data SMS |

When the base station (TX) sends a signal and requests the coordinates of the GPS-MS1E-AT(RX), events are triggered, the GSM controller will be triggered based on the events. For each event an action and the data transmitted can be defined. Events may be the output of the GPS engine (position, time) or an external signal. If the conditions for a trigger are met, the assigned action will be performed. The GSM controller can control the sending of the AT commands through the configuration protocol. Only SiRF binary protocol can be used to control the AT command Firmware. The AT commands will then be sent from the GSM controller to initiate the modem. The control and communication with the AT command firmware is performed using the serial interface.

Figure 13:
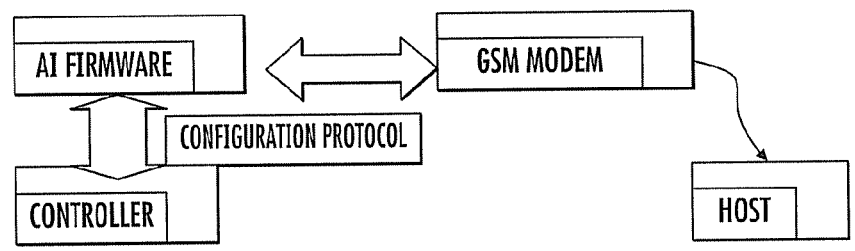
FIG. 13 is a schematic diagram of connections between various components of the present invention.

Referring to FIG. 13, a schematic diagram of the connections between various components of the present invention. To transmit the coordinates back to the base station, action can be triggered by the use of the AT Firmware. GPS-MS1E-AT communicates with a GSM modem via the AT-standard (GSM 07.05, 07.07). Firstly, the action RX turns on the GPS modem, that means sending the action RX to the modem awakes the modem and enables it to receive calls or SMS. The action Data Call then opens a data connection to a host. There are two modes used for data calls. In data mode you can send the same requests to the module as in SMS, a request also has to be sent at least every 30 s to keep the connection alive. In online mode you will have to answer "sense" messages to keep the connection up. If a data connection is opened, the AT-Firmware enters data mode. Data will eventually be transferred back to the requested host by the configuration protocols, which the AT-Firmware uses to communicate with hosts.

Connection to the GSM Modem

The GPS receiver does only have to be connected to the serial port of the GSM modem. Some GSM modems support an external pin to switch the modem on. For modem with support of this function, we recommend to connect this pin. This allows the controller to restart the modem in case of problems. For example,

| MS1E pin name | Signal Name | Modem line Siemens M20 | Modem Line Falcom A2D | Modem line Wavecom WMOD2D |
|---|---|---|---|---|
| TX0 | Modem RX | USCRX | DATA . . . RX2 | RX |

Before a modem can be used with the AT option, the modem has to be configured. A PC with a serial port and a terminal program is needed to do this. First, the modem has to be connected to a serial port of the PC and the terminal program has to be opened on that serial port. Normally after applying power, a switch on signal has to be generated to turn on the modem. Sending AT<CR> should cause the modem to answer with OK<CR><LF>. If strange characters are returned the baud rate of the serial port is wrong. If nothing is returned, the serial connection may be broken or the modem is not on. There are external wires that must be connected to the modem. If we want to use a mobile phone with AT interface, you probably do not have access to the on/off reset signal. If we do not connect the on/off and reset lines(not recommended), we have to activate no power up mode in the configuration.

The command set used by the Hayes Smartmodem 300™, as well as most modems today (with a few advanced commands), is known by those of skill in the art as the AT command set. AT stands for attention, and precedes all (with the exception of A/) commands directed to the modem. For example, when dialing, it is necessary for either the software or the user to issue an ATDT or ATDP command followed by the number and enters. AT tells the modem that it is about to receive a command. DT tells it to dial by tone, while DP tells it to pulse dial.

Finally, the modem dials the number given to it after the command. Different modems do have slightly different command sets, but generally most modems follow the Hayes standard.

EXAMPLES

Figure 5:
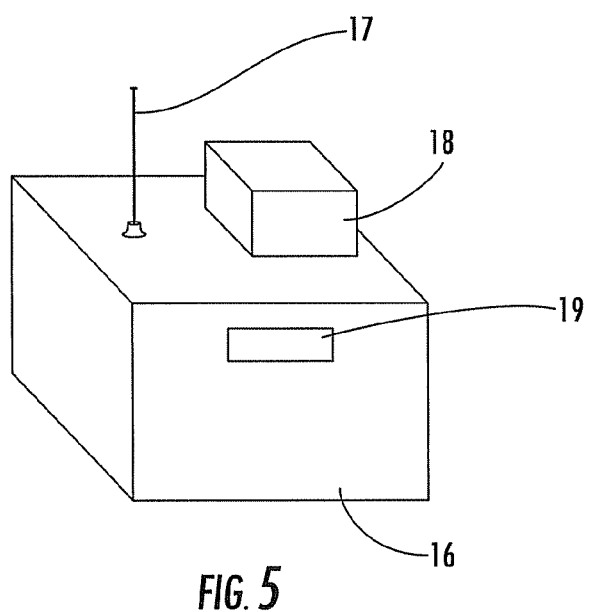
FIG. 5 is a perspective view of a base station according to an embodiment of the present invention.

% Cn—Enable/Disable Data Compression
% En—Auto-Retrain control
&Cn—DCD Control
&Dn—DTR Option
&Fn—Recall Factory Profile Referring to FIG. 5, a perspective view of a base/mobile station 16 is illustrated. Base/mobile station 16 contains a readout screen 19, a communications antenna 17 and all the necessary hardware to communicate with collar 1 (not shown). Readout screen 19 can be an LCD in order to read and map the coordinates when the collar is polled and for any diagnostics needed on the base station. Station 16 can be a stand-alone unit or a wireless phone with location capabilities and of the new 3-G design. The capability to reprogram individual collars in the field and manage a heard is built into the station. However, each collar can communicate with other collars eliminating the need for exterior management. In one embodiment, the base station can be used as a differential station whereby it would include a GPS module 106 (not shown). Here using standard differential methods, corrections could be passed to collar 1 through antenna 17. The base station could also be used to download new boundary coordinates to a subject 20 wearing collar 1. This would be especially useful in military operations to adjust front line boarders, or send coordinates of dangerous areas such as mine fields.

In one embodiment, the correction module 4 is in communication with both the GPS chip 106 and communications hardware 107. For pet containment, and livestock control, the correction hardware consists of an audible device 5 and/or a behavior modification device such as a high voltage stimulus 6. Referring to FIG. 9, a schematic diagram of a typical correction device is illustrated. The correction device can be a high voltage circuit for delivering an electrical shock to an animal, such as a pet. LM 317 adjusts the intensity of the shock supplying a pulsar based on the LM 555 timer necessary to excite transformer 116, and 114 is a MOSFET switch for isolation. When the MS1E detects that a subject is dangerously close to a boundary, it will activate an IO line 110 internal in 106 and after signal conditioning, will transmit through 8 a correction signal. This signal could be audible as in 5, or a shock such as 6. In the event that the correction hardware was to take control of a situation, the feedback control data link 116 (shown in FIG. 8) would upload or transmit any signals necessary external to the module 106.

In the training phase, collar 1 has the capability to define a volume as in FIG. 1B, 1C while in the implementation phase, collar 1 can communicate to a base station 16 or to another collar 1. This information may consist of an exchange in coordinates, change in coordinates, rates of change of coordinates, or information such as identity and physiological parameters of the object. With this system, each object 20 can be defined as a volume .DELTA. V 101 and have its centroid coordinates 102 passed from collar 1 to collar 1 or to a station such as 16 (shown in FIG. 1A). The coordinates may be transmitted continuously, non-continuously, or when polled by another collar 1 or the base station 16.

The operating system consists of training phase, and a running phase, means of communication and computation all integrated in into a portable package. Although a mobile or base station is not required for basic operation, it can be used in this embodiment.

Figure 10:
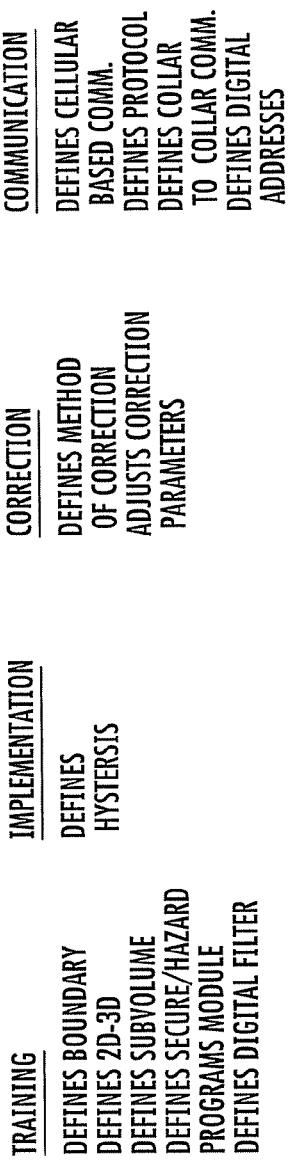
FIG. 10 is a chart of phases included in the embedded software of the present invention.
Figure 11:
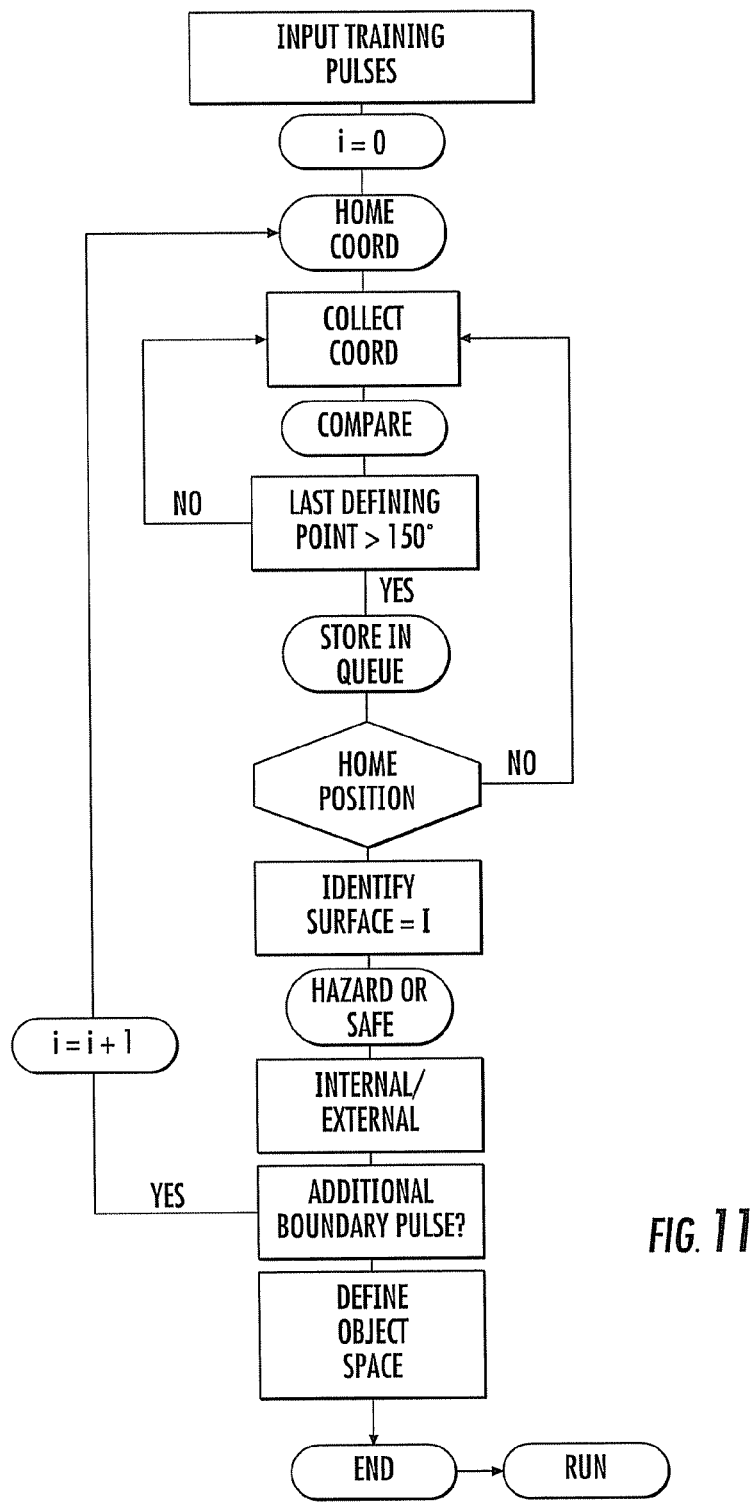
FIG. 11 is a flow chart of the training phase of the present invention.
Figure 12:
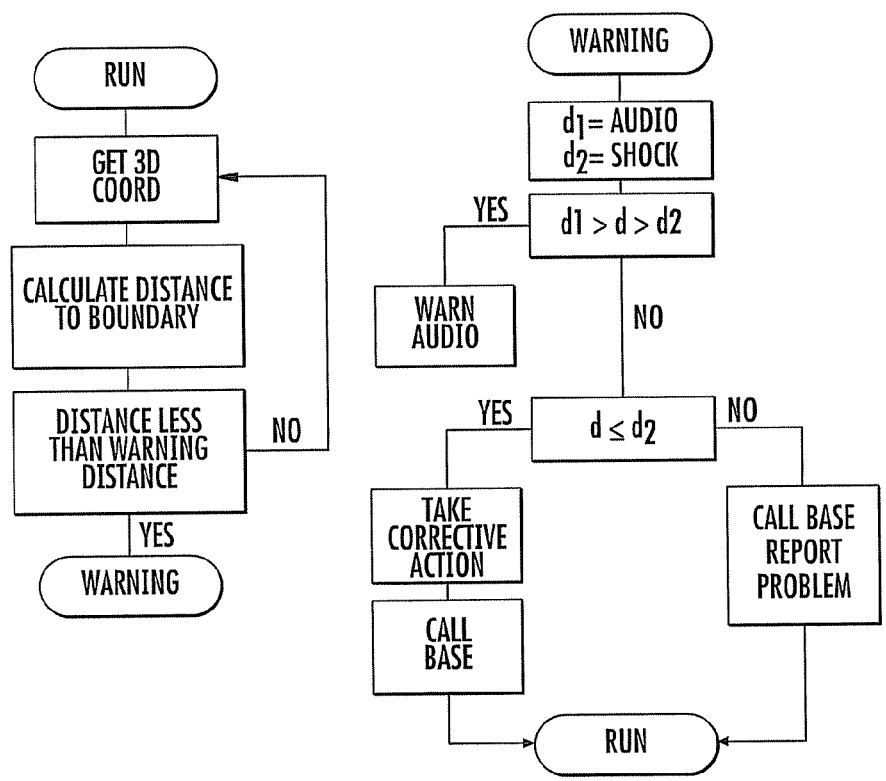
FIG. 12 is a flow chart of the implementation phase of the present invention.

In the preferred embodiment, collar 1 is worn by a pet and accepts GPS signals through antenna 3 and processes them through RF section 108. These signals are digitized to produce location coordinates, which are stored in memory 108. A computer program also stored in memory 108 has the ability to operate on these coordinates as a function of time and space. A flow chart for this program is shown in FIG. 10-12 and described in more detail below.

All analog and digital support electronics are also placed inside electronic module 2 as indicated in FIGS. 2 & 8. This section also contains analog and digital electronics batteries, necessary to support the communications section of electronic module 2, power any antennas as well known by one skilled in the electronics area.

Regular GPS receivers, when first switched on, can take several minutes to find four satellites, which isn't acceptable for location-based services. (A cell phone's battery would be drained too quickly if it kept the GPS receiver on all the time.) Instead, most will use a solution called Assisted GPS, which also keeps an active GPS receiver at every base station. This broadcasts the precise time eliminating the need for a fourth satellite- and tells the phone where to look for the other three satellites.

Assisted GPS is particularly useful in Code Division Multiple Access (CDMA) networks, because all of their base stations already include GPS receivers. (CDMA systems need to know the precise time for synchronization purposes, and the GPS time signal provides the accuracy of an atomic clock at a much lower cost.) It also has two other benefits: the base stations act as a backup when satellites aren't visible, and it can be more accurate.

Most satellite systems require a clear line of sight between the satellite and the receiver. The GPS signals are slightly more resilient—they can pass through many windows and some walls—but they still won't work deep inside a building or underground. Assisted GPS can fall back to base station triangulation in these situations, providing at least some information whenever a user is able to make a call.

Qualcomm Incorporated, pioneer and world leader of Code Division Multiple Access (CDMA) digital wireless technology, produces the RFR3300™, an RF-to-IF (radio frequency to intermediate frequency) front-end receiver designed for cellular, personal communications service (PCS) and Global Positioning System (GPS) signal processing. The RFR3300™ device is the first in the CDMA industry to integrate GPS capability with a CDMA front-end receiver.

The RFR3300™ device is silicon germanium (SiGe) BiMOS radio frequency integrated circuit (RFIC) that provides high linearity with very low power consumption. The advanced integration of a GPS receiver into a CDMA/AMPS receiver eliminates the need to add an extra stand-alone GPS RF receiver. Together with Qualcomm's MSM3300 Mobile Station Modem (MSM)™ chipset and IFR3300 baseband receiver, the RFR3300™ device offers the cost-effective and high-performance solution for dual-band (PCS CDMA and AMPS) or tri-mode (cellular CDMA, AMPS, and PCS CDMA) phones with Qualcomm's gpsOne™ position location technology. The gpsOne solution offers robust data availability under challenging conditions, such as in concrete-and-steel high-rises, convention centers, shopping malls or urban canyons.

Qualcomm's RFR3300™ device integrates dual-band low noise amplifiers (LNAs) and mixers for downconverting from RF to CDMA and FM IF, and contains a dedicated LNA and mixer designed for downconverting global positioning system (GPS) signals from RF to IF. The RFR3300™ receiver operates in the 832 MHz 894 MHz cellular band, 1840 MHz-1990 MHz PCS band and 1575 MHz GPS band. The RFR3300™ device meets cascaded Noise Figure (NF) and Third-Order Input Intercept Point (IIP3) requirements of IS-98 and JSTD-018 for sensitivity, and two-tone intermodulation. The RFR3300™ solution was also designed to meet the sensitivity requirements of gpsOne™.

The cellular LNA in the RFR3300™ device offers gain control capability for improving dynamic range and performance in the presence of high levels of interference. Reducing the gain in the LNA also improves power consumption. Band selection and gain modes are controlled directly from the MSM3300™ chip. The RFR3300™ device is designed for use with voltage ranges from 2.7V to 3.15V, and is available in a 5 millimeter by 5 millimeter 32-pin BCC++ plastic package.

The MSM3300™ chipset is comprised of the MSM3300™ CDMA modem, RFT3100™ analog-baseband-to-RF upconverter, IFR3300™ IF-to-baseband downconverter, RFR3300™ RF-to-IF downconverter—the first front-end receiver in the industry to incorporate GPS capabilities in a CDMA chipset—PA3300™ power amplifier, PM1000™ power management device and the SURF3300™ development platform. QCT's gpsOne™ technology is integrated on the MSM3300™ chip, which provides all of the position location capabilities without the need for additional chips, reducing board space and potential size of the handsets. QCT's gpsOne™ solution, featuring SnapTrack™ technology, offers robust data availability under the most challenging conditions, whether in concrete-and-steel high-rises, convention centers, shopping malls or urban canyons. Using a hybrid approach that utilizes signals from both the GPS satellite constellation and from CDMA cell sites, the gpsOne solution enhances location services availability, accelerates the location determination process and provides better accuracy for callers, whether during emergency situations or while using GPS-enabled commercial applications. The gpsOne™ solution deployed by KDDI is supported by SnapTrack's SnapSmart™ location server software, which provides the core position calculation function for KDDI's eznavigation service. Additional information regarding the MSM3300™ chipset can be found at URL:

http://www.cdmatech.com/solutions/pdf/msm3300generation.pdf; and http://www.cdmatech.com/solutions/pdf/positionlocation.pdf, which are incorporated herein by reference.

There are many technologies available for the communication as well as the GPS location electronics. For instance, the Qualcomm MSM3300 chipset has communications and location capability all in a single chipset. This system is based on (WA)GPS or "hybrid positioning" incorporating both cell phones and GPS. In another embodiment, "Bluetooth" could be used for communication for short range applications, less than 100 m. The protocol for the communications system is also standard and could rely on Global System for Mobile Communications (GSM), Time Division Multiple Access (TDMA), Code Division Multiple Access (CDMA), Frequency Division Multiple Access (FDMA), or other suitable protocols known to those of skill in the art.

The training phase of the software involves data collection, angle calculation and finally, storage of "essential" boundary points. To learn the boundary of an area, the user will walk around that boundary with the device. As the user walks around the desired boundary, the module records the current position. The training algorithm takes these points and, using simple geometrical equations, decides which of them constitutes a turning point, or sharp angle, in the boundary path. These angle points (or "essential" points) are then stored in an array that can be used to effectively, reconstruct the boundary path. This is accomplished by connecting each set of adjacent points through standard linear or polynomial methods. Boundaries within a boundary and 3-D systems are possible.

Upon completing the boundary by returning to the home position (the first stored point in the boundary array) the device automatically switches to the running phase. In this phase the device recalculates its current position. Using this position, it calculates the distance from each "wall" section of the boundary. Using the shortest distance found, it determines whether it is within a warning or error distance from the boundary. Based on this result it returns the appropriate output through the general I/O pins of the module.

Software

Referring to FIG. 10, a chart of phases included in the embedded software of the present invention is illustrated. The embedded software consists of three phases: a training phase (shown in FIG. 11), an implementation phase (shown in FIG. 12), and a communication phase. Referring now to FIGS. 1, 2, and 6, in a preferred embodiment, collar 1 is all that is needed to define a boundary or volume. Collar 1 is simply walked around the boundary 105 in a manner such that the coordinates are received from satellites 103, stored in the onboard computer in 106. In this example, the coordinates are read from the satellite and stored in the collar 1 each second. It initiates the training phase, the user begins at a "home point" which is arbitrary and the training phase is initiated. This initiation could start by activating an internal switch in collar 1, or by activating a soft switch using port 7 on the collar. For example, the 3 coherent light pulses directed into port 7 could act as a software switch to begin the training mode, and 3 long pulses and 3 short pulses could be used to activate a diagnostics mode. Using the window soft switch will allow designs more robust to the outside environment.

FIG. 11 is a limiting example of the flow programmed into collar 1. In this example, collar 1 is initiated into the training phase using soft switch 7, 7b. At this point, the home coordinates are recorded and collar 7 begins collecting x,y,z coordinates and comparing them to previous coordinates. If the coordinates have not changed, the program ignores, but continues to receive coordinates. Here, each coordinate is compared to a multiple of coordinates stored in the queue. If the angle between the new coordinate and the set of points in queue 204 is greater than some previously defined angle such as 150 degrees, the coordinate is stored and the collar continues to process a new point. In the event that the coordinate is found to be close to the home coordinate, the collar automatically stops the process and identifies the boundary as boundary 1.

If more boundaries are to be defined, the user activates the soft switch 7 using 7b, the counter is incremented and the new boundary is defined in the same method as the primary boundary.

For complicated boundary examples such as the union of 9, 10, 11, 12 as in FIG. 1A, the user could begin by defining 9, first, then defining 10, 11, and then the internal boundaries 12. Each area is defined as a separate region. The program would then assume that all external areas such as 9, 11, and 10 were secure zones, while all interior areas such as 12 were hazard zones. Optionally, each area could be defined independently using the programming wand 7b to identify areas 9, 10, 11, and 12 as a hazard zone or a secure zone, whereby each type of zone would have independent codes.

Three-dimensional volumes as illustrated in FIG. 1C are programmed in much the same way. In one embodiment, an area 117 is programmed into collar 1, then again over another area 118 at a different altitude or z component. The software would then assign a secure/un-secure area to the volume defined between the two areas. FIGS. 1b and 1c is an illustration of a three dimensional volume defined by this method. Parametric equations could also be incorporated to define surfaces. Conversely, the secure area could be outside of this defined area as opposed to the interior of it. Here, aircraft would be alerted that they were approaching a hazard space, and the correction hardware would warn the pilots or automatically take control by the feedback system 116. 3-D volumes would also have the ability to form the union of two spaces, allow corridors between spaces, and allow the definition of interior volumes within a volume. For terrestrial 3-D mapping, the collar 1 could simply be walked around an area such as 105 in FIG. 1A, and then walked around upstairs 119 in the house as shown in FIG. 1A. Here, the secure zone could be defined as certain areas upstairs 119, and the defined area 105. Anything not defined within a volume could default to either a secure or a hazard zone.

In another embodiment, an aircraft could fly a pattern at a first altitude, and again fly an altitude at a second altitude, and the collar 1 would define the 3-D volume between these two patterns as a secure or hazard zone. Then, other volumes could be defined interior or exterior to the primary volume, corridors attached, and a space for safe flying is thus defined.

In still another embodiment of the present invention, the coordinates could be downloaded in collar 1 using port 7. In this example, coordinates could be keyed into a device such as a PDA, laptop, or base/mobile station shown in FIG. 5, and through the communication software downloaded by radio through antenna 17. In this manner, space 105 is dynamic and fully programmable and addressable to each collar 1.

FIG. 5 illustrates the base/mobile station. Device 16 contains a microprocessor, a display, communication module 17, and a GPS module 18. In one example, the base/mobile station could be used for a differential station where the coordinates are precisely known. By reading its position from satellites 103, any error correction can be passed to collar 1 for enhanced accuracy. Display 19 could simply be a LCD that shows the parameters such as location, speed and diagnostics, or it could display the 3-D airspace and the proximity of an object to this display. Using the display, a collar programmer can see the defined space, and check for errors before downloading the boundary coordinates to collar 1.

Implementation Phase:

When the collar has detected that the training phase has been completed, it switches to the run mode. In this mode, when subject 20 surrounded by an object volume 101 (see FIG. 1A) approaches the boundary 105, a series of corrective actions take place. For instance, when object 20 is 2 meters from boundary 105 I/O a line in 110 goes high and an audible signal 5 is produced. When the object is 1 meter from the boundary, a second I/O line goes high, and a more serious correction signal such as a shock takes place. Simultaneously, the communications software initiates a call from 20 and through port 9 sends the location data to base station 16.

Predictions of position can also be calculated by collar 1 using the velocity 102 and acceleration vectors. Here, if the subject is fast approaching the boundary 105, the digitally controlled correction signal amplitude and rate can be increased.

The present invention has the capability to define an object space 101 around each subject such as 20. In this example, each collar 1 is in continuous communication with a plurality of collars and the base station. In a limiting example, the communication data contains parameters such as location, speed, identity, and physical parameters of the subjects 20. When two subjects are found to be close to one another, the correction software warns each subject, and possibly the base station 16.

Each boundary 105 has a hysteresis zone adjacent to the boundary 105 or space 101. The purpose of a hysteresis zone is much like any feedback control system. This spacial zone is used to dampen the action of correction based on upgoing and downscale going of the measured variable such as location. In effect, it will keep any oscillation of the correction signals produced by 20 as is well known by control engineers.

If for example, the object breaches the secure zone, the embedded software in collar 1 will call the base/mobile station and alert the authorities, and after several attempts of corrective action will cease. In this manner, an escaped or lost pet such as 20 can continue to try and find home without penalty.

With the means and methods set forth herein of this invention, the following limited example of collar 1 programming is discussed.

Queue

The queue holds all the critical points, which will be used during the implementation phase. The training phase only determines the critical coordinates and stores these coordinates in the queue. The X, Y, Z coordinate of each critical point is stored within one node on the queue. The first training lap uses these three points:

1. Last coordinate stored in queue,
2. Previous coordinate,
3. Current coordinate.

In essence, from the last stored coordinate the invention waits for 2 more acquisitions before starting to determine the sharp angle. This equation is a distance formula $Dist^2=X^2+Y^2$ and the inverse cosine function. The second lap around the boundary secures parameter shapeliness using time sampling.

A simple height or Z dependence is also possible. Here, the height at the home position is one height stored. Then in the running phase, it simply checks if the current height is within the correction or warning distance from the ceiling or floor heights. This algorithm that could be used inside a structure such as a home. If the animal is allowed to be on the first floor, then the height could be used to keep the animal from venturing to the second floor. Also, using the corridor algorithm, the animal could be allowed to transverse up the stairs to a particular room, but be excluded from others. Conversely, it could be allowed to visit a neighbor, but only through a certain "path".

Figure 14A:
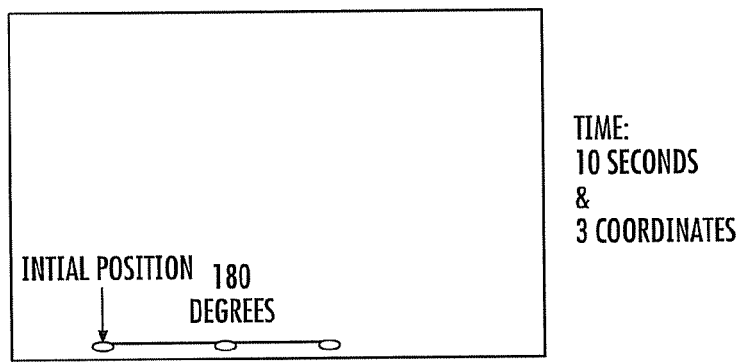
FIGS. 14A-15C are schematic diagrams of exemplary training laps.
Figure 14B:
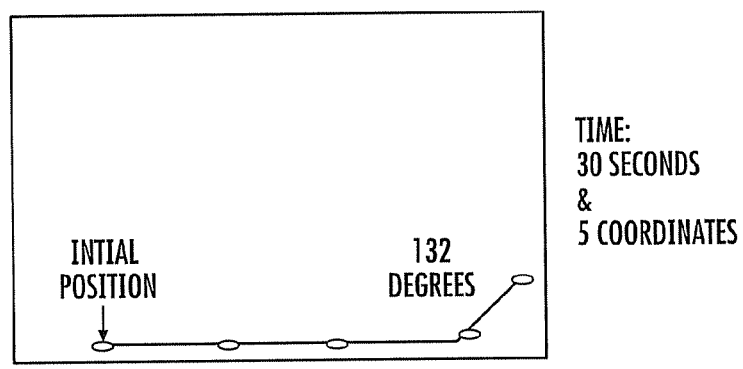
Figure 14C:
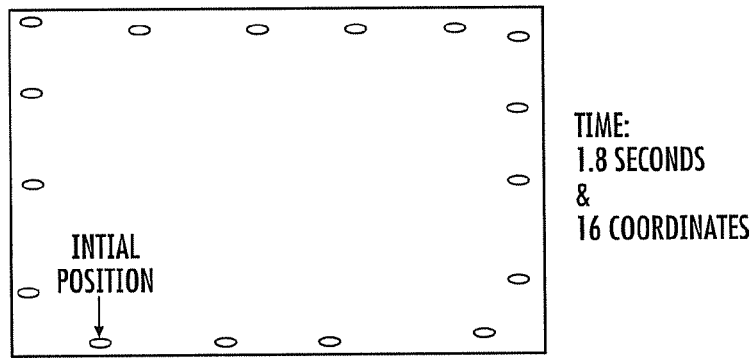
Figure 14D:
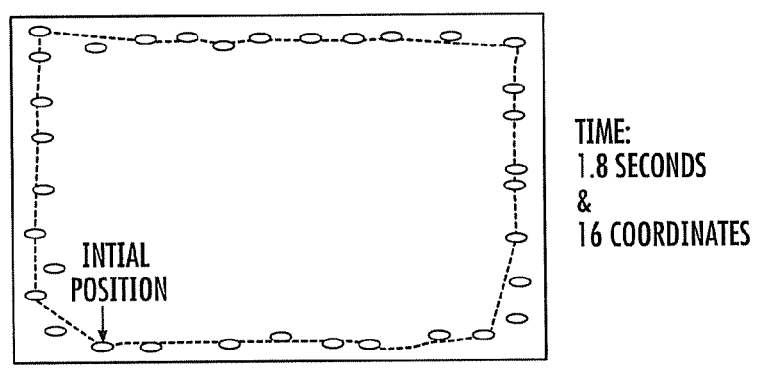

Referring to FIG. 14A-14C, schematic diagrams of training laps for a rectangular shaped perimeter are illustrated. Once a coordinate is acquired, the angle between that coordinate and the last acquired coordinate is calculated and if it is less than our threshold angle (151 degrees) that coordinate is stored in the queue.

Figure 15A:
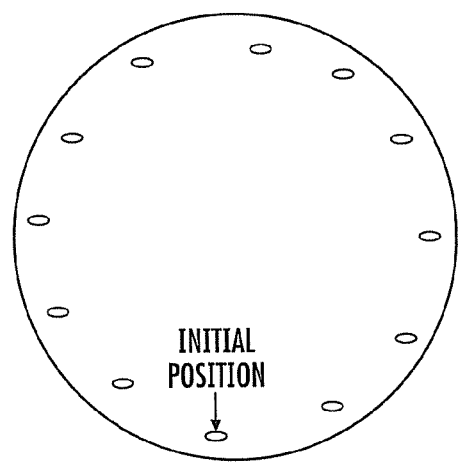
Figure 15B:
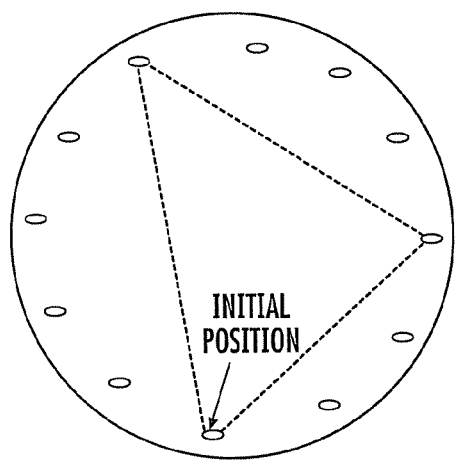
Figure 15C:
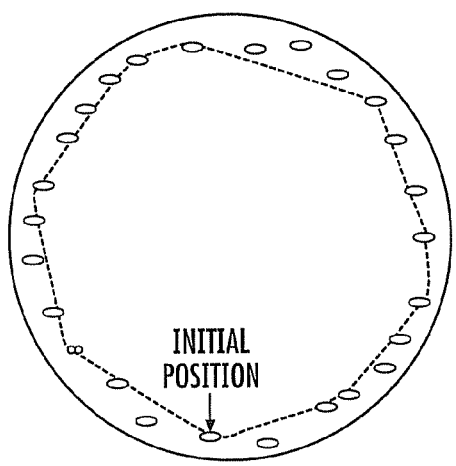

Referring to FIGS. 15A-15C, schematic diagrams of training laps for a circular shaped perimeter are illustrated. Of course, the possibility exists that our area perimeter is not a rectangle. For instance, if our perimeter is a circle, we would end up with a few coordinates but not enough coordinates to get the correct shape of the boundary.

Figure 16:
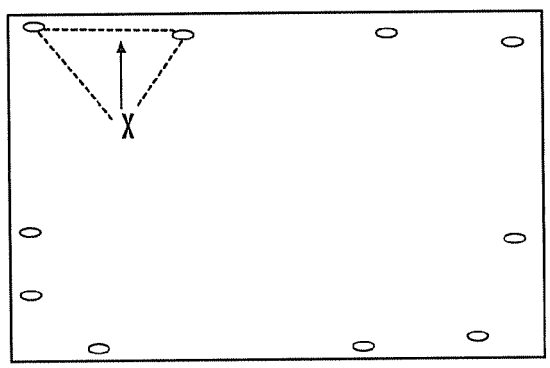
FIG. 16 is a schematic diagram of a perimeter and a subject.

In order to avoid this problem, the invention includes a second lap in the training phase that utilizes a time sample. During the first lap of the training phase, time is kept so that we know how long it takes to make one lap around the perimeter. After breaking this time into intervals, we can know where to take additional samples. For example, with a rectangular area:

Referring to FIG. 16, a schematic diagram of a perimeter and a subject is illustrated. Once the boundary is stored in the collar 1, the device automatically jumps to the run phase where coordinates from satellites 103 are used to detect the position of subject 20. An example is provided in FIG. 16.

Figure 17:
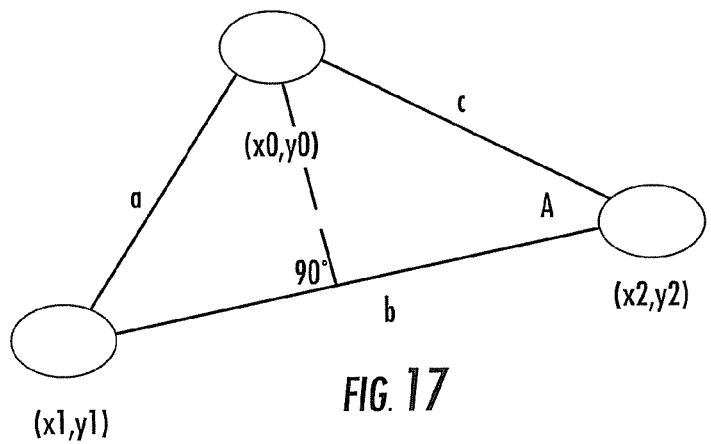
FIGS. 17 and 18 are schematic diagrams of geometric formulas for determining the distance to a perimeter.

Referring to FIG. 17, a schematic diagram of a geometric formula for determining the distance of a subject to a perimeter is illustrated. In the following calculations, triangulation is used to determine the animal's distance to the boundary. If the subject is represented by the coordinates (0, y0) in the basic geometric formula following, the distance between (x0, y0) and (x2, y2) is given by:

Sine Function:

$\sin A = opp/hyp$ $\sin A = X/c$ $X = c^* \sin A$ $X$=wall distance

Figure 18:
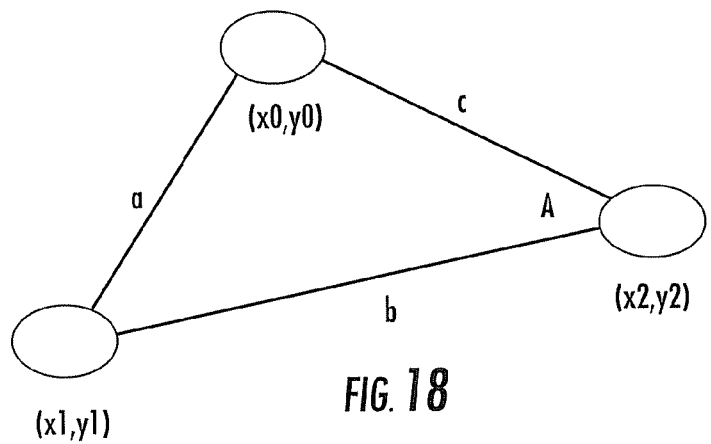

Referring to FIG. 18, a schematic diagram of a geometric formula for determining the distance of a subject to a perimeter is illustrated. When calculating the angles for the queue, the law of cosines is used to calculate the angle A shown in FIG. 18 and in the following "Law of Cosine" equations. When this angle is greater than 151 degrees, the point is stored as a critical point for boundary purposes. Simply connecting the critical points then forms the boundary. Interpolation can also be used to smooth a boundary.

Law of Cosine $A^2 = b^2 + c^2 - (2bc^* \text{Cosine } A)$ $A = \text{Inverse Cosine}((b^2 + c^2 - a^2)/2bc)$ There is no need to retrain the device after a power-off if you are going to be using the same boundary as last time the device was on. It stores those boundary coordinates between power ups. However, if you do need to retrain the module, you do this by holding down both the black and red reset buttons at the same time for just a second while the module is powered on. Once you release these buttons and begin walking around the new boundary, a new Training Phase will begin.

Many modifications and other embodiments of the invention will come to mind to those skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the claims. Although specific terms are employed herein, they are used in a generic and descriptive sense only and not for purposes of limitation.

It will be understood that various details of the invention may be changed without departing from the scope of the invention. Furthermore, the foregoing description is for the purpose of illustration only, and not for the purpose of limitation—the invention being defined by the claims.

What is claimed:

1. A method performed by a first mobile device in a first space in communication with a second mobile device in a second space, the method comprising:
   detecting an occurrence of a proximity notification event defined by the second device;
   responsive to detection of the proximity event and determining a reply based on a location with respect to a destination or boundary point location; and
   communicating position with a notification from the first device to the second device and sending a notification to the second device.

2. The method of claim 1, wherein the first and second mobile devices are each configured to program one of a boundary and point location event.

3. The method of claim 2, wherein the one of the boundary and point location is a dynamic location of one of the first mobile device and the second mobile device.

4. The method of claim 1, wherein the reply is a wireless communication comprising at least location, speed, identity, diagnostic data, time, a map, a message, a text, short messaging service (SMS), automatically or when polled.

5. The method of claim 1, wherein each of the first and second mobile devices are configured to receive a request for notifications from other mobile devices.

6. The method of claim 1, wherein the first and second mobile devices are one of in direct communication and communicate through a stationary or mobile base station.

7. The method of claim 1, wherein information about the location comprises at least one of global positioning satellite (GPS) information, cellular triangulation information, BLUETOOTH® based information, radio triangulation, wireless triangulation, and assisted GPS information.

8. The method of claim 1, wherein the first mobile device communicates wirelessly using at least one of short messaging service (SMS), text, voice, map, cellular network, and email.

9. The method of claim 1, wherein the notification is based on the first mobile device approaching the boundary as defined by the second mobile device.

10. The method of claim 9, where each of the devices comprises one of a mobile phone, personal digital assistant (PDA), base station, laptop, a server, a processor, and personal computer (PC).

11. The method of claim 9, wherein the boundary of the second mobile device is a dynamic location of the second mobile device.

12. The method of claim 1, wherein detection of the proximity event comprises determining the first mobile device entering or exiting a geographic region containing an area, a boundary, or point of interest, and wherein the area, the boundary, or the point of interest of the geometric zone defined by the second device which may be stationary or mobile.

13. The method of claim 1, wherein each mobile device can be represented by an object space, specify an instant location, configured to implement an algorithm to notify itself or another mobile device of a boundary alarm, capability for two way communication with another mobile device or base station, define and send zones of alarm, send a message, send data to connect to a host, read and map coordinates, operate on complex or simple shapes, obtain position estimates based on location, velocity, acceleration, and transmit information one of location, speed, identity, diagnostics, medical parameters automatically or when polled.

14. The method of claim 1, wherein the first mobile device is a portable application device.

15. The method of claim 14, wherein the first mobile device consists of a cellular communication device.

16. A method performed by a first mobile device in communication with a second mobile device, the method comprising:
   obtaining input specifying a notification of a location event:
   receiving a notification from the second mobile device in response to occurrence of the specified location notification event, the notification being an alarm including one of location, date, time, mapping, and estimates on arrival at the location; and
   sending information related to the location notification event to the second mobile device.

17. The method of claim 16, further comprising:
   sending a request for or polling for custom notifications to the second mobile device; and
   handshaking or two way communicating information to at least a second device located in a second space.

18. The method of claim 16, further comprising providing a base station or mobile station containing a readout screen, communication equipment, and hardware to communicate readout and map coordinates.

19. The method of claim 16, wherein the mobile devices are configured to read and map coordinates.

20. The method of claim 16, wherein the alarm is a response to the second mobile device departing or arriving to a location area, boundary, or point of location.

21. A system comprising:
   one or more processors and memory operatively connected to the one or more processors and configured to store instructions when executed by the one or more processors configured to:
   detect an occurrence of a proximity notification event defined by the second device;
   responsive to detection of the proximity event and determining a reply based on a location with respect to a destination or boundary point location; and
   communicate position with a notification from the first device to the second device and send a notification to the second device.

22. The system of claim 21, wherein the notification comprises an alarm based on a location event, or an arrival of a location event determined with velocity and acceleration vectors.

23. The system of claim 21, further comprising a wearable device including the one or more processors and memory.

24. The system of claim 23, wherein the wearable device comprises one of a collar, a wearable band, embedded equipment for clothing, a device for wear by a person, a mobile phone, and a device for attachment to a vehicle.

25. The system of claim 21, wherein the one or more processors are configured to implement the detection, response, and communication.

26. The system of claim 21, wherein information about the location comprises at least one of global positioning satellite (GPS) information, cellular triangulation information, BLUETOOTH® based information, radio triangulation, wireless triangulation, and assisted GPS information.

27. A system comprising:
a first mobile device comprising one or more processors and memory configured to:
receive input specifying at least one metric of a position of the first mobile device with respect to the second mobile device;
determine an occurrence of an event meeting the at least one metric; and
present notification of the event in response to determining the occurrence.

28. The system of claim 27, wherein the metric is associated with one of a location event, a position arrival estimate, velocity, and acceleration.

29. The system of claim 27, wherein the first mobile device is one of a mobile phone or a wearable device.

30. The system of claim 29, wherein the wearable device is one of a collar, a wearable band, embedded equipment for clothing, a device for wear by a person, a smartphone, and a device for attachment to a vehicle.

31. The system of claim 27, wherein the one or more processors are configured to implement the functions of receipt, determine, and present in real time.

32. The method of claim 27, wherein information about the location comprises at least one of global positioning satellite (GPS) information, cellular triangulation information, BLUETOOTH® based information, radio triangulation, wireless triangulation, and assisted GPS information.

* * * * *